United States Patent
Senda et al.

(10) Patent No.: US 10,919,081 B2
(45) Date of Patent: Feb. 16, 2021

(54) PUNCHING METHOD, PUNCHING DEVICE, AND METHOD FOR MANUFACTURING LAMINATED IRON CORE

(71) Applicant: JFE STEEL CORPORATION, Tokyo (JP)

(72) Inventors: Kunihiro Senda, Tokyo (JP); Masanori Uesaka, Tokyo (JP); Yoshihiko Oda, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 553 days.

(21) Appl. No.: 15/543,077

(22) PCT Filed: Jan. 7, 2016

(86) PCT No.: PCT/JP2016/050323
§ 371 (c)(1),
(2) Date: Jul. 12, 2017

(87) PCT Pub. No.: WO2016/114212
PCT Pub. Date: Jul. 21, 2016

(65) Prior Publication Data
US 2018/0001369 A1    Jan. 4, 2018

(30) Foreign Application Priority Data
Jan. 14, 2015  (JP) .................................. 2015-005233

(51) Int. Cl.
*B21D 28/14*    (2006.01)
*B26F 1/42*    (2006.01)
(Continued)

(52) U.S. Cl.
CPC ............. *B21D 28/14* (2013.01); *B21D 28/22* (2013.01); *B21D 35/005* (2013.01);
(Continued)

(58) Field of Classification Search
CPC ...... B21D 35/007; B21D 28/22; B21D 28/00; B21D 28/02; B21D 28/14; H02K 15/02; B26F 2210/02; B26F 1/40; B26F 1/44
(Continued)

(56) References Cited

U.S. PATENT DOCUMENTS 2,369,896 A * 2/1945 Harris ................... B21D 28/34
83/685
3,724,305 A * 4/1973 Kondo .................. B21D 28/16
83/14
(Continued)

FOREIGN PATENT DOCUMENTS

CN  101390272 A  3/2009
CN  101523696 A  9/2009
(Continued)

OTHER PUBLICATIONS

Chinese Office Action for Chinese Application No. 201680005601.9, dated Jul. 4, 2018, with Concise Statement of Search Report, 7 pages.
(Continued)

*Primary Examiner* — Shelley M Self
*Assistant Examiner* — Jared O Brown
(74) *Attorney, Agent, or Firm* — RatnerPrestia

(57) ABSTRACT

A punching method includes: punching out a plurality of electrical steel sheets in a stacked state by a mold, wherein sheet thicknesses of the electrical steel sheets are set to be 0.35 mm or less, a Vickers hardness (test force 1 kg) of the sheets is set to be 150 to 400, and an average crystal grain size of the sheets is set to be 50 to 250 μm, a clearance of the mold is set to be 7% or more of a minimum sheet thickness of the sheet thicknesses of the electrical steel sheets and equal to or lower than 7% of a total sheet thickness of the electrical steel sheets, and a pressure that a
(Continued)

sheet presser of the mold applies to the electrical steel sheets is set to be 0.10 MPa or more.

8 Claims, 4 Drawing Sheets

(51) Int. Cl.
| | |
|---|---|
| *H01F 1/147* | (2006.01) |
| *B21D 43/28* | (2006.01) |
| *C22C 38/00* | (2006.01) |
| *C22C 38/06* | (2006.01) |
| *H01F 41/02* | (2006.01) |
| *B21D 35/00* | (2006.01) |
| *B21D 28/22* | (2006.01) |
| *H01F 41/061* | (2016.01) |
| *H01F 1/16* | (2006.01) |
| *C22C 38/60* | (2006.01) |

(52) U.S. Cl.
CPC ............. *B21D 35/007* (2013.01); *B26F 1/42* (2013.01); *C22C 38/00* (2013.01); *C22C 38/06* (2013.01); *H01F 1/14716* (2013.01); *H01F 41/02* (2013.01); *H01F 41/061* (2016.01); *B21D 43/287* (2013.01); *C22C 38/60* (2013.01); *H01F 1/16* (2013.01)

(58) Field of Classification Search
USPC .................................. 72/363, 336, 337, 338
See application file for complete search history.

(56) References Cited

U.S. PATENT DOCUMENTS

| | | | | | |
|---|---|---|---|---|---|
| 5,180,459 | A | * | 1/1993 | Bauer ................... | B01D 61/362 |
| | | | | | 156/89.26 |
| 5,443,195 | A | * | 8/1995 | Sinn ..................... | B26D 7/1818 |
| | | | | | 225/104 |
| 5,458,717 | A | * | 10/1995 | Kurita .................... | B21D 28/16 |
| | | | | | 156/250 |
| 5,526,560 | A | * | 6/1996 | Tsuruya ................. | B21D 28/10 |
| | | | | | 29/596 |
| 5,992,280 | A | * | 11/1999 | Oishi ..................... | B21D 28/14 |
| | | | | | 72/334 |
| 6,205,831 | B1 | * | 3/2001 | Adey .................... | H01M 2/0222 |
| | | | | | 72/334 |
| 6,340,399 | B1 | | 1/2002 | Tanaka et al. | |
| 6,401,510 | B1 | * | 6/2002 | Morse ................... | B26D 3/085 |
| | | | | | 72/327 |
| 7,667,367 | B2 | | 2/2010 | Matsu et al. | |
| 7,777,387 | B2 | | 8/2010 | Nagai et al. | |
| 8,508,097 | B2 | | 8/2013 | Okamoto et al. | |
| 2008/0098788 | A1 | * | 5/2008 | Taniguchi ............. | B21D 28/16 |
| | | | | | 72/336 |
| 2008/0229799 | A1 | * | 9/2008 | Musat .................... | B21D 28/22 |
| | | | | | 72/336 |
| 2012/0317786 | A1 | * | 12/2012 | Wang ................... | B21D 39/031 |
| | | | | | 29/505 |
| 2015/0256036 | A1 | * | 9/2015 | Nakamura ............ | H01F 41/024 |
| | | | | | 310/216.048 |
| 2016/0121421 | A1 | * | 5/2016 | Uhm ..................... | B23K 9/167 |
| | | | | | 310/216.004 |
| 2018/0358871 | A1 | * | 12/2018 | Hasuo .................. | H02K 15/022 |

FOREIGN PATENT DOCUMENTS

| | | | | |
|---|---|---|---|---|
| CN | 101641852 | A | | 2/2010 |
| DE | 19944273 | A1 | | 4/2001 |
| EP | 2722976 | B1 | * | 3/2020 ............... H01F 3/04 |
| JP | 55156623 | A | | 12/1980 |
| JP | 60106947 | A | | 6/1985 |
| JP | 60152323 | A | | 8/1985 |
| JP | 07201551 | A | | 8/1995 |
| JP | 2001059145 | A | | 3/2001 |
| JP | 2002047542 | A | * | 2/2002 |
| JP | 2002047542 | A | | 2/2002 |
| JP | 2003153503 | A | | 5/2003 |
| JP | 2003153503 | A | * | 5/2003 |
| JP | 2003213385 | A | | 7/2003 |
| JP | 2003253404 | A | | 9/2003 |
| JP | 2003264962 | A | | 9/2003 |
| JP | 2005261038 | A | | 9/2005 |
| JP | 3835137 | B2 | | 10/2006 |
| JP | 2012050989 | A | | 3/2012 |
| JP | 2012115893 | A | | 6/2012 |
| JP | 2012115893 | A | * | 6/2012 ........... B21D 35/007 |
| JP | 2012115894 | A | | 6/2012 |
| JP | 5630150 | B2 | | 11/2014 |
| JP | 2016116318 | A | * | 6/2016 |
| RU | 2522912 | C2 | | 7/2014 |
| SU | 283965 | A1 | | 10/1970 |
| SU | 1049144 | A1 | | 10/1983 |

OTHER PUBLICATIONS

Chinese Office Action with Search Report for Chinese Application No. 201680005601.9, dated Mar. 8, 2019, 9 pages.
Extended European Search Report for European Application No. 16737283.8, dated Oct. 4, 2017, 10 pages.
Russian Office Action for Russian Application No. 2017128461, dated Jul. 24, 2018, with translation, 10 pages.
International Search Report and Written Opinion for International Application No. PCT/JP2016/050323, dated Mar. 1, 2016—6 Pages.

* cited by examiner

PUNCHING METHOD, PUNCHING DEVICE, AND METHOD FOR MANUFACTURING LAMINATED IRON CORE

CROSS REFERENCE TO RELATED APPLICATIONS

This application is the U.S. National Phase application of PCT International Application No. PCT/JP2016/050323, filed Jan. 7, 2016 and claims priority to Japanese Patent Application No. 2015-005233, filed Jan. 14, 2015, the disclosures of both applications being incorporated herein by reference in their entireties for all purposes.

FIELD OF THE INVENTION

The present invention relates to a punching method of an electrical steel sheet that is used for an iron core of a motor, a punching device, and a laminated iron core manufacturing method.

BACKGROUND OF THE INVENTION

In recent years, attempts have been made in reduction in size of iron cores in order to reduce weights of motors and generators of electric cars and hybrid electric cars mainly, and increase in rotation has been advanced (increase in frequency) for ensuring output. From a viewpoint of decreasing iron loss of the iron core, a thinner electrical steel sheet having a sheet thickness of 0.25 mm or less, which is smaller than conventional, has been increasingly desired.

The iron cores of the motors and the generators are manufactured by using, as a base material, an electrical steel sheet having a sheet thickness reduced for decreasing eddy current loss, and punching the electrical steel sheet. When punching, a mold for workpiece is installed in a press machine, respective parts of the iron core are punched out in the mold while a coil feeding device feeds out steel strips formed by slitting the steel sheet into predetermined widths. The iron core is manufactured by subjecting a plurality of iron core element pieces after the punching to interlocking in the mold for integration, or removing the iron core element pieces from the mold, and then, integrating them by welding or fixing with bolts. The iron core manufactured by laminating and integrating the thin electrical steel sheets in this manner is referred to as a laminated iron core.

The above-mentioned punching is generally employed because it is excellent in productivity. On the other hand, the iron core element pieces need to be punched out one by one in a normal punching. Accordingly, when the sheet thickness of the base material is reduced, a large number of element pieces are required to manufacture the iron core and productivity is drastically lowered. Punching techniques in a state in which the base material steel sheets are stacked and solutions of problems related to the techniques are disclosed.

For example, Patent Literatures 1 and 2 disclose techniques of fixing a plurality of steel sheets using interlocking or the like in a process before punching at an early stage of a press process in a mold in order to address a problem of deviation among the steel sheets when the steel sheets are stacked and simultaneously fed into the mold. Patent Literature 3 discloses a technique of forming an integration locking portion for fixing steel sheets and flattening a projection of the integration locking portion using push back so as not to cause the projection shape from becoming an obstacle in a lamination process. All of these techniques disclose countermeasures against deterioration in dimensional accuracy when the steel sheets are simultaneously punched out.

Patent Literatures 4 and 5 disclose techniques of enabling punching of a plurality of steel sheets to be simultaneously executed by one press process while preventing shear droop and burrs from being increased by a mold having a plurality of portions corresponding to punches and dies therein.

Patent Literature 6 discloses that a plurality of steel sheets are bonded to each other while a crystal grain size is set to be 20 n (μm) or more when n indicates the number of laminated sheets. Patent Literature 7 discloses a non-oriented electrical steel sheet for a rotor in order to prevent deterioration in magnetic characteristics of an iron core that occurs when a split iron core is manufactured.

CITATION LIST

Patent Literature

Patent Literature 1: Japanese Laid-open Patent Publication No. S55-156623
Patent Literature 2: Japanese Laid-open Patent Publication No. 2003-153503
Patent Literature 3: Japanese Laid-open Patent Publication No. 2005-261038
Patent Literature 4: Japanese Laid-open Patent Publication No. 2012-115893
Patent Literature 5: Japanese Laid-open Patent Publication No. 2012-115894
Patent Literature 6: Japanese Laid-open Patent Publication No. 7-201551
Patent Literature 7: Japanese Laid-open Patent Publication No. 2003-253404

SUMMARY OF THE INVENTION

It is generally known that plastic strain remains in the vicinity of punched end portions and magnetic characteristics are deteriorated therein because the punched end portions receive strong plastic deformation in the punching. When the deterioration amount of the magnetic characteristics is quantitatively evaluated, the deterioration amount cannot be explained only by the plastic strain. It is therefore considered that elastic strain remaining with the plastic deformation also affects the deterioration in the magnetic characteristics. Thus, the punching is excellent in productivity but has a problem in that it deteriorates the magnetic characteristics of the iron core. When a plurality of stacked steel sheets are subject to the punching, binding force between the stacked steel sheets is weak and a plastically deformed portion is therefore enlarged, resulting in deterioration in the magnetic characteristics in comparison with the case in which the punching is performed on the sheets one by one. Accordingly, when the electrical steel sheets are stacked and simultaneously punched out, a problem of deterioration in the magnetic characteristics of the iron core occurs.

The above-mentioned techniques disclosed in Patent Literatures 1 to 5 have focused attention on only deterioration in the dimensional accuracy of the iron core and increase in the amounts of the shear droop and the burrs due to the punching of the steel sheets and disclose no improvement solution related to the deterioration in the magnetic characteristics of the iron core.

In the techniques disclosed in Patent Literatures 4 and 5, the stacked steel sheets are not simultaneously punched out by one mold. These techniques have an advantage from a viewpoint of the deterioration in the magnetic characteristics but have a disadvantage that the mold configuration is complicated and the mold cost is largely increased. Furthermore, these techniques do not disclose a method for efficiently integrating and binding a plurality of iron core element pieces provided by punching with the punches and dies.

Furthermore, the technique disclosed in Patent Literature 6 has aimed at reduction in abrasion of a mold when the steel sheets are stacked and punched out and has not studied a solution for preventing the deterioration in the magnetic characteristics in the punching. With the technique, the punching is performed in the state in which the steel sheets are bonded to each other and a process mode thereof is different from that in which the steel sheets are stacked immediately before being pressed and are subject to the punching. The technique disclosed in Patent Literature 7 has aimed at prevention of the deterioration in the magnetic characteristics of the iron core that occurs when the split iron core is manufactured and has not taken punching of a plurality of stacked steel sheets into consideration.

The present invention has been made in view of the above-mentioned circumstances and an object thereof is to provide a punching method, a punching device, and a laminated iron core manufacturing method capable of simultaneously punching a plurality of stacked electrical steel sheets while decreasing deterioration in iron loss to the minimum.

To solve the above-described problem and achieve the object, a punching method includes punching out a plurality of electrical steel sheets in a stacked state by a mold. Sheet thicknesses of the electrical steel sheets are set to be 0.35 mm or less, a Vickers hardness (test force 1 kg) of the sheets is set to be 150 to 400, and an average crystal grain size of the sheets is set to be 50 to 250 µm. A clearance of the mold is set to be 7% or more of a minimum sheet thickness of the sheet thicknesses of the electrical steel sheets and 7% or less of a total sheet thickness of the electrical steel sheets, and a pressure that a sheet presser of the mold applies to the electrical steel sheets is set to be 0.10 MPa or more.

Moreover, in the above-described punching method according to the present invention, the sheet thicknesses of the electrical steel sheets are set to be 0.25 mm or less.

Moreover, in the above-described punching method according to the present invention, a static friction coefficient between surfaces of the stacked electrical steel sheets is set to be 0.3 or more, and static friction coefficients between the electrical steel sheets and a surface of a die plate of the mold that makes contact with the electrical steel sheets and between the electrical steel sheets and a surface of the sheet presser of the mold are set to be 0.3 to 0.8.

Moreover, in the above-described punching method according to the present invention, the electrical steel sheets contain Si of 0.5 to 6.6%, Al of 2.5% or less, and Mn of 0.1 to 3.0% in terms of mass ratio, and the number of inclusions having a grain size of 0.1 to 3.0 µm in steel is set to be in a range of 1000 to 8000 pieces/mm².

A punching device according to the present invention includes a mold, and the punching device is configured to punch a plurality of electrical steel sheets in a stacked state. Sheet thicknesses of the electrical steel sheets are set to be 0.35 mm or less, a Vickers hardness (test force 1 kg) of the sheets is set to be 150 to 400, and an average crystal grain size of the sheets is set to be 50 to 250 µm. A clearance of the mold is set to be 7% or more of a minimum sheet thickness of the sheet thicknesses of the electrical steel sheets and 7% or less of a total sheet thickness of the electrical steel sheets, and a pressure that a sheet presser of the mold applies to the electrical steel sheets is set to be 0.10 MPa or more.

Moreover, a laminated iron core manufacturing method according to the present invention includes laminating and integrating iron core element pieces punched using the punching method according to the above-described invention to manufacturing a laminated iron core.

According to the present invention, a plurality of stacked electrical steel sheets can be simultaneously punched out while decreasing deterioration in iron loss to the minimum.

DETAILED DESCRIPTION OF EMBODIMENTS OF THE INVENTION

Figure 1:
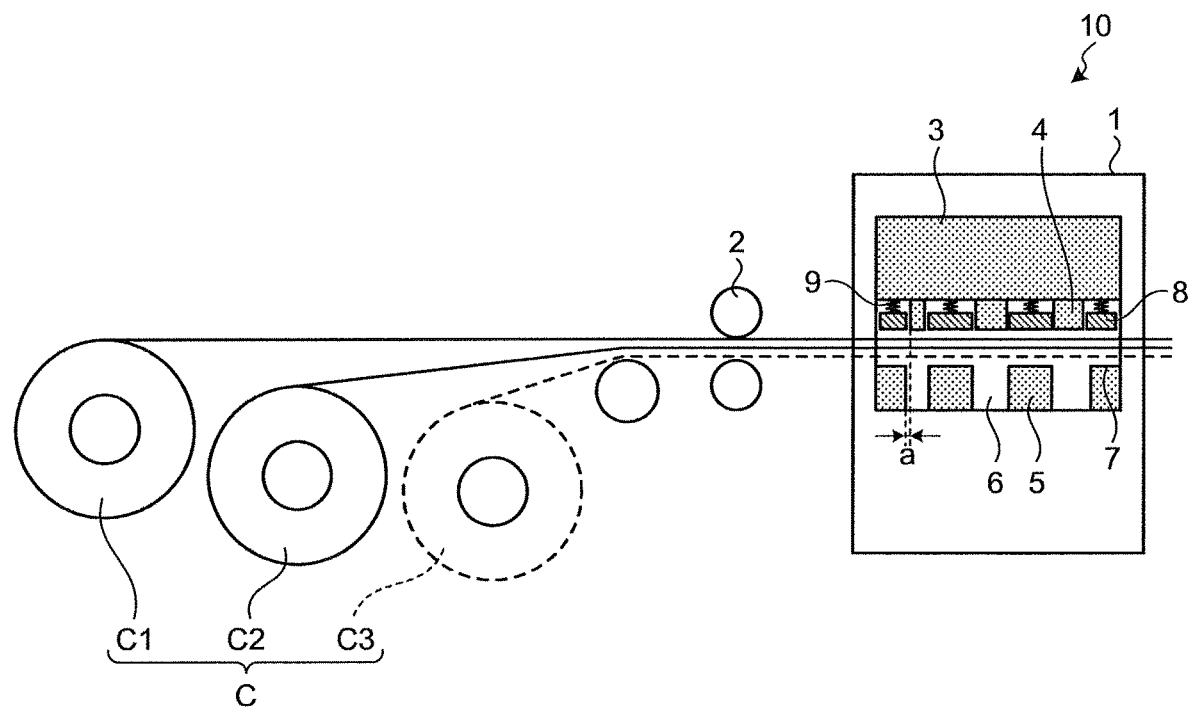
FIG. 1 is a schematic plan view for explaining the configuration of a punching device and the outline of punching process according to an embodiment of the invention.

Hereinafter, a punching process by a punching device and a method for manufacturing a laminated iron core according to an embodiment of the present invention will be described in detail with reference to the drawings. It should be noted that the embodiment does not limit the present invention.
Configuration of Punching Device First, the configuration of a punching device and the outline of punching process in the embodiment are described with reference to FIG. 1. As illustrated in FIG. 1, a punching device 10 includes a press machine 1 and pinch rolls 2. A mold 3 used for punching that is installed in the press machine 1 includes a punch 4 and a die 5. A die hole 6 as a through-hole having a shape corresponding to a shape of an iron core element piece to be molded and a die plate 7 making contact with a steel sheet are formed on the die 5. The punch 4 is configured so as to be elevated and lowered relative to the die 5 by a control device (not illustrated). When the punch 4 arranged at a position corresponding to the die hole 6 is inserted into the die hole 6, the steel sheet interposed in the mold 3 is sheared and punched out along the shape of the die hole 6. A predetermined interval (clearance a) is set between the punch 4 and the die 5. The mold 3 includes a sheet presser 8 to press the steel sheet in the vicinity of end portions thereof from the side of the punch 4 when punching, thereby pressing and restraining the steel sheet against and to the die plate 7. A biasing unit 9 such as a spring is provided on the sheet presser 8.

The iron core element pieces are punched out while a plurality of steel strip coils C (C1 to C3) provided by cutting a steel sheet into predetermined widths are stacked and are fed out to the mold 3 by the pinch rolls (coil feeding device) 2. The iron core element pieces after the punching process are subjected to interlocking in the mold 3 for integration, thereby manufacturing a laminated iron core. Alternatively, the laminated iron core is manufactured by removing the iron core element pieces from the mold 3, and then, integrating them by welding or fixing with bolts.

Principles of Invention

The present invention prevents deterioration in magnetic characteristics (iron loss) of the laminated iron core (hereinafter, also referred to as an iron core) in the punching of the electrical steel sheets (hereinafter, also referred to as steel sheets) stacked as described above. First, the inventors have focused on influence of a binding force applied between the stacked (laminated) steel sheets in the punching. Then, the inventors have considered that simultaneous control of both of conditions of the mold 3 and the material to be processed (steel sheet) can increase the binding force between the steel sheets and decrease the deterioration in the magnetic characteristics (iron loss) in the punching in the stacked state to the minimum, and have achieved the present invention. That is to say, the individual steel sheets give influences on one another through surface friction in shearing process in the state where the steel sheets are stacked. However, under normal conditions, the frictional force is insufficient to prevent the deterioration in the iron loss due to the punching. The inventors have considered that the frictional force between the steel sheet surfaces can be controlled appropriately by controlling the conditions of the mold 3 and the base material than conventional control more precisely. At first, the inventors have focused on force that the sheet presser 8 applies to the steel sheets in the punching in order to improve the binding force using the frictional force between the steel sheet surfaces. Furthermore, the inventors have tried to control a friction coefficient between the steel sheet surfaces and a friction coefficient between the steel sheets and the surface of the mold 3 that makes contact therewith to be in appropriate ranges.

Moreover, under the above-mentioned conditions, strong tensile stress is applied to the end portions of the steel sheets during the shearing process to the stacked steel sheets. When the strong tensile stress is continuously applied and transmitted, portions with the deteriorated magnetic characteristics are enlarged. It has been found that usage, as steel, of a material having high hardness, which is easy to cause breakage during the shearing process, is effective for shortening a period of time during which the tensile force is applied during the shearing process to reduce a range in which the stress remains. Moreover, it has been found that usage of steel sheets having a crystal grain size in a range compatible with punching conditions is effective for preventing enlargement of the elastically and plastically deformed region from the worked end portions. Conventionally, it has been known that the hardness of the material to be processed gives influence on the magnetic characteristics after the punching. It has been newly found that setting of the hardness of the material to be processed to a predetermined condition is particularly effective in the punching in the stacked state and the present invention has been made.

Furthermore, it has been known that the clearance a gives influence on the shape and characteristics of the material to be processed in the punching. When the steel sheets are stacked and subjected to the punching, it has been found that appropriate selection of the clearance a is extremely effective in addition to increase of the restrain force between the laminated steel sheets and prevention of the enlargement of the elastically and plastically deformed region in the punching. The inventors have known that definition of the lower limit of the clearance a by a ratio relative to a sheet thickness of a steel sheet having a minimum sheet thickness among the steel sheets and definition of the upper limit thereof by a ratio relative to the total sheet thickness of the steel sheets are effective. The above-mentioned definition is considered to be effective because a strain manner of the end portions of the steel sheets when punching the laminated steel sheets is different from that in the punching one steel sheet.

Furthermore, it has been found that simultaneous control of steel components and the amount of inclusions in the steel causes early breakage of the material during the punching to reduce the stress remaining amount due to the elastic plastic deformation during the process.

In order to prevent the deterioration in the iron loss of the iron core in the punching of the stacked electrical steel sheets, both of an absolute value and a deterioration ratio of the iron loss of the iron core after the punching need to be considered. For seeking only the preferable magnetic characteristics of the iron core, it is sufficient that the absolute value of the iron loss of the iron core is tried to be reduced simply without taking the deterioration ratio due to the work into consideration. Usage of the electrical steel sheet having a coarse crystal grain size and preferable magnetic characteristics for the base material of the iron core inevitably increases the manufacturing cost of the base material, resulting in increase in the product price. It is therefore important to take the iron loss deterioration ratio into consideration for seeking manufacturing of a preferable product while considering the total cost of the iron core. The iron loss deterioration ratio is calculated from the following equation (1)

$$\text{Iron loss deterioration ratio (\%)} = (W_P - W_0)/W_0 \times 100 \quad \text{[Equation 1]}$$

$W_P$: Iron loss of iron core provided by punching work in state in which steel sheets are stacked $W_0$: Iron loss of iron core having same shape that is provided by working method causing sufficiently decreased iron loss deterioration due to strain Punching Process The punching process in the embodiment satisfies the following requirements defined based on the above-mentioned findings. The embodiment employs a wire cutting method as a work method for $W_0$ in the above-mentioned equation (1).

[Sheet Thickness of Electrical Steel Sheet: 0.35 mm or Less (Desirably 0.25 mm or Less)

In the embodiment, the electrical steel sheet having the sheet thickness of 0.35 mm or less is used as the base material of the laminated iron core. When the sheet thickness is increased to be larger than 0.35 mm, an advantage to be provided by the punching that is simultaneously performed on the steel sheets for improving production efficiency of the iron core is lowered. Furthermore, the total sheet thickness of two steel sheets or more is excessively large and it is difficult to keep dimensional accuracy of the iron core in the laminated state. In addition, preferable magnetic characteristics are not necessarily provided even by punching under other requirements, which will be described later.

The sheet thicknesses of the steel sheets that are stacked are not necessarily the same and the steel sheets having different sheet thicknesses can be combined. In this case, it is sufficient that the thickness of the steel sheet having the largest sheet thickness is set to be 0.35 mm or less. As will be described in a second example later, the sheet thickness of the steel sheet that is used is desirably 0.25 mm or less.

Clearance: 7% or more of Thickness of One Steel Sheet Having Minimum Sheet Thickness and 7% or less of Total Thickness of Stacked Steel Sheets It is generally known that the clearance a gives influence on the shape of the punched end portions in the punching. The clearance a needs to be changed in accordance with the sheet thickness. When the steel sheets are stacked and punched out, the respective sheet thicknesses of the stacked steel sheets and a total value of the sheet thicknesses of the steel sheets are factors that can give influence on an appropriate value of the clearance a. The appropriate value of the clearance a needs to be defined in consideration of respective contributions.

In the embodiment, the lower limit of the clearance a is set to be 7% or more of the thickness of the steel sheet having the minimum sheet thickness among the stacked steel sheets based on a first example and the second example, which will be described later. In the normal punching work, when the clearance a is excessively small, a secondary sheared surface is generated in some cases but the magnetic characteristics are not significantly deteriorated. When the punching is performed in the state in which the steel sheets are stacked, a minimum value of the clearance a needs to be set in accordance with the sheet thickness of the steel sheet having the minimum sheet thickness (see, examples indicated in numbers 38, 39, 44, and 45 in Table 2 in the second example, which will be described later) in order to prevent the deterioration in the magnetic characteristics of the iron core. It is considered that the clearance a needs to be set in this manner for the following reason. That is, in the punching of the multilayered steel sheets, a deviation amount (drawing amount) of the steel sheets in the vicinity of the punched end portions in the lateral direction is large and the steel sheet end portions are therefore easy to be deformed with elevation of the punch 4. This influence becomes more significant in the steel sheet having the smaller sheet thickness and lower rigidity. Accordingly, in order to reduce the influence of the deformation that is received when the punch 4 is elevated due to the excessively small clearance a, the clearance a is set to be 7% or more of the sheet thickness of the steel sheet having the minimum sheet thickness among the steel sheets that are stacked.

On the other hand, the upper limit of the clearance a is set to be 7% or less of the total thickness of the stacked steel sheets based on the first example and the second example, which will be described later. This is a necessary condition for preventing the deterioration in the iron loss by decreasing the deflection amount of the steel sheets to the minimum when the punching is performed on the stacked steel sheets. The embodiment employs a method of making the steel sheets be more close to be integrated by appropriately controlling the sheet presser 8 or the friction coefficient of the steel sheet surfaces as will be described later. In comparison with the punching to one steel sheet, a drawing amount of the steel sheets into the die hole 6 tends to be increased during the punching to the stacked steel sheets. A ratio of the clearance a relative to the total sheet thickness of the stacked steel sheets is set to be a value that is smaller than that of the clearance a when the steel sheets are regarded as one steel sheet.

Sheet Presser Pressure: 0.10 MPa or more

In general, the sheet presser 8 of the mold 3 for the punching is used mainly for preventing jumping of the material to be punched in the punching. By contrast, in the embodiment, the sheet presser 8 is used for increasing the binding force in the vicinity of the end portions of the stacked steel sheets on which the shearing process is performed when the steel sheets are stacked and are subjected to the punching. By pressing the steel sheets sufficiently with the sheet presser 8, deviation of positions is reduced between the steel sheets and the drawing amount of the steel sheets into the die hole 6 during the punching, and the deformation amount of the end portions of the steel sheets is reduced. As a result, the deterioration in the magnetic characteristics of the steel sheets is reduced. In order to obtain this result, the pressure (sheet presser pressure) that the sheet presser 8 applies to the steel sheets is set to be at least 0.10 MPa. When the sheet presser pressure is lower than 0.10 MPa, the binding force between the steel sheets is lowered during the punching and the local deviation amount of the end portions during the punching is increased, resulting in the deterioration in the magnetic characteristics.

In the embodiment, the sheet presser pressure is preferably set to be in a range of 0.30 to 0.80 MPa based on the first example, which will be described later, in a further limited manner. An effect of increasing the binding force between the stacked steel sheets is enhanced particularly when the sheet presser pressure is set to be 0.30 MPa or more. On the other hand, when the sheet presser pressure is higher than 0.80 MPa, it can be said that the binding force between the steel sheets is sufficiently high but the iron loss deterioration ratio is increased. As a reason for this, it is estimated that a speed at which a stripper plate of the sheet presser 8 and the steel sheets hit each other is increased when the punching is continuously performed to make strain easy to be generated in the steel sheets.

The sheet presser 8 can have the above-mentioned functions by causing the sheet presser pressure to be applied to the local portions of the base material in the vicinity of the punch 4 during the punching. A force that the sheet presser 8 presses the material to be processed using the mold 3 is normally uniform over the entire surface of the stripper plate of the sheet presser 8, and the force is therefore calculated by dividing a total value of the force acting on the sheet presser 8 by the area of the sheet presser 8.

Crystal Grain Size of Electrical Steel Sheets: Average Crystal Grain Size of 50 to 250 μm The crystal grain size is an important factor dominating the magnetic characteristics of the non-oriented electrical steel sheets. It is generally known that as the crystal grain size is larger, the iron loss is more excellent. Influence by the crystal grain size of the electrical steel sheets that are subject to the punching to the deterioration in the magnetic characteristics of the iron core after the punching has not been well known (see Patent Literatures 6 and 7).

The present invention controls the crystal grain size of the electrical steel sheets on which the punching is simultaneously performed to be in an appropriate range in addition to the requirements of the punching process in order to prevent the deterioration in the magnetic characteristics that are easy to occur when the punching is performed on the steel sheets in the stacked state.

In the punching of the steel sheets, the binding force between the steel sheets is required to be increased with the sheet presser pressure, the frictional force between the steel sheet surfaces, and the like but only the increase in the binding force is not sufficient to prevent the deterioration in the iron loss in the iron core element pieces after the punching. That is to say, the drawing amount of the steel sheet having a relatively weak binding force among the stacked steel sheets into the die hole 6 with the lowering of the punch 4 is increased. When the steel sheet is punched out in a state in which the elastic plastic deformation is generated in the end portions thereof, an accumulation amount of the strain on the end portions of the steel sheet after the punching is increased and the iron loss of the iron core is deteriorated. The accumulation amount of the strain due to the elastic plastic deformation is considered to be increased in accordance with increase in unevenness of mechanical characteristics in the base material. Grain boundary portions and inner portions of the crystal grains are roughly distributed in the steel sheet having a coarse crystal grain size. The deterioration in the iron loss is therefore considered to be significant in the punching in the state in which the steel sheets are stacked. On the other hand, the crystal grain boundaries are densely distributed in the steel sheet having a fine crystal grain size to cause the deformation to uniformly occur in the steel sheet, thereby preventing the deterioration in the iron loss.

In the embodiment, when the steel sheets are stacked and are subject to the punching, the sheet presser pressure is increased and the crystal grain size is set to 50 to 250 µm (more desirably 100 to 200 µm) based on the second example, which will be described later. With this setting, the iron loss deterioration amount can be made small and the absolute value of the iron loss of the iron core after the punching can be made sufficiently decreased. On the other hand, when the sheet presser pressure is not sufficient, the effect of decreasing the absolute value of the iron loss of the iron core cannot be sufficiently provided even by setting the crystal grain size to 50 to 250 µm (100 to 200 µm). That is to say, the desired effect is provided only by appropriately controlling both of the crystal grain size and the sheet presser pressure.

As described above, when the crystal grain size is increased to be larger than 200 µm or 250 µm, the amount of strain remaining in the end portions of the steel sheets is increased and the increase amount of the iron loss of the iron core is increased when the steel sheets are stacked and are subject to the punching. The upper limit of the crystal grain size is therefore set to 250 µm, and preferably 200 µm. On the other hand, when the crystal grain size is smaller than 100 µm or 50 µm, the above-mentioned deterioration in the iron loss is avoided but the magnetic characteristics of the base material itself of the iron core is inferior and the absolute value of the iron loss of the manufactured iron core is therefore inferior. Accordingly, such a crystal grain size is not appropriate for a material for a high-efficient motor. In consideration of this, the lower limit of the crystal grain size is set to be 50 µm, and preferably 100 µm.

It is sufficient that the average crystal grain size is calculated based on observation of the cross section of the steel sheets. That is to say, the crystal grain size is suitably evaluated with an imaging process by providing a sample cross section by cutting and polishing, and then, exposing the crystal grain boundaries by an etching process.

The average crystal grain size is calculated as follows. First, the average area that the crystal grain occupies the cross section is provided by counting the number of crystal grains present in the observation area and dividing the observation area by the number of crystal grains. When the shape of the crystal grains is assumed to be circular, the average crystal grain size is calculated from the calculated average area of one crystal grain. When the average crystal grain size calculated by this method is 80 µm or less, the value is employed as the average crystal grain size.

On the other hand, when the crystal grain size is coarse and the cross section contains partial fine crystal grains or cuts a portion around a grain boundary triple junction, the above-mentioned method generates errors in the calculation of the grain size. For preventing generation of the errors, when the average crystal grain size calculated by the above-mentioned method is larger than 80 µm, calculation involving weighting by the area ratios of the individual crystal grains observed in the cross section is suitable. That is to say, when the area of each crystal is assumed to be S(i) and the area ratio is assumed to be r(i), the average crystal grain area is expressed by the following equation (2). By regarding the shape of the crystal grains to be circle, the average crystal grain size can be calculated as an equivalent circle diameter from the average crystal grain area.

$$\langle S \rangle = S(i) \times r(i) \qquad \text{[Equation 2]}$$

Hardness of Electrical Steel Sheets: Vickers Hardness (test force 1 kg) of 150 to 400

When the hardness of the material is increased, elongation is lowered and the material to be processed is broken at an early stage in the shearing process. It is considered that the drawing amount of the material to be processed into the die hole 6 is reduced and the accumulation amount of the strain in the vicinity of the worked end portions is decreased, thereby preventing the deterioration in the iron loss. As mentioned above, in the punching in the state in which the steel sheets are stacked, the drawing amount of the material to be processed (steel sheets) into the die hole 6 is easy to be increased and the degree of importance for appropriately controlling the breakage of the material to be processed is extremely higher than that in the normal punching work.

In the present invention, the conditions of the sheet presser 8 and the frictional force between the electrical steel sheet surfaces are simultaneously made appropriate to thereby increase the binding force between the electrical steel sheets to some degree. In addition, the hardness of the material (electrical steel sheets) is set to be in an appropriate range to cause the breakage during the punching to occur at appropriate positions, thereby preventing the deterioration in the iron loss.

A significant effect of preventing the deterioration in the iron loss is provided by controlling the Vickers hardness of the base material to be in an appropriate range as indicated in the second example, which will be described later. The iron loss deterioration ratio when two electrical steel sheets or more are stacked and punched out is inferior to the iron loss deterioration ratio when one electrical steel sheet is punched out and improvement for this in the future is necessary.

The hardness of the steel sheets can be evaluated by measuring the Vickers hardness and can be limited by a measurement value (HV1) with a weight of 1 kg. In the embodiment, in order to provide the above-mentioned iron loss deterioration prevention effect, the hardness of the electrical steel sheets is set to be the Vickers hardness of 150 or more. As indicated in the second example, which will be described later, the steel sheets having the Vickers hardness of 190 or more are particularly suitable. When the Vickers hardness of the steel sheets exceeds 400, it is disadvantageous from a view point of damage of the mold 3. For this reason, the Vickers hardness of the steel sheets is limited to be 400 or more.

Static Friction Coefficient between Electrical Steel Sheet Surfaces: 0.3 or more Static Friction Coefficient between Die Plate Surface Making Contact With Electrical Steel Sheets and Electrical Steel Sheets and Static Friction Coefficient between Sheet Presser Surface and Electrical Steel Sheets: 0.3 to 0.8

As described above, the present invention uses the effect provided by increase in the binding force between the steel sheets when the stacked steel sheets are simultaneously punched out. The above-mentioned effect is provided by increasing the static friction coefficient of the steel sheet surfaces. That is to say, the static friction coefficient between the surfaces of the electrical steel sheets that are stacked and are subject to the punching is required to be controlled. When different electrical steel sheets are used, the static friction coefficient between the stacked surfaces of the electrical steel sheets is preferably evaluated.

Furthermore, in order to prevent the steel sheets from being drawn into the die hole 6 in the punching, the frictional forces particularly in the vicinity of the punch 4 on the surface of the die plate 7 and the surface of the sheet presser 8 that make contact with the electrical steel sheets on which the punching is performed are required to be simultaneously increased. The static friction coefficients between the electrical steel sheet surface and the surfaces of the above-mentioned members of the mold 3 need to be 0.3 or more. In order to provide the effect, the static friction coefficient of the mold 3 in a region of approximately 10 mm or more in the vicinity of the die hole 6 is required to be controlled. That is to say, the above-mentioned effect can be provided by a method of changing roughness and so on in the region having a width of approximately 10 mm or more in the vicinity of the die hole 6 or the entire surfaces of the sheet presser 8 and the die plate 7 that make contact with the electrical steel sheets.

In precise punching process, a method of increasing the binding force in the punching by providing a projection on the sheet presser 8 and causing the projection to be bitten into the material is also employed. However, such biting of the projection deteriorates the magnetic characteristics of the iron core and is not therefore preferable in the punching of the iron core material for motors and generators.

In the embodiment, the static friction coefficient between the steel sheet surfaces is set to be 0.3 or more and the static friction coefficients between the steel sheet surface and the mold member surfaces making contact with the steel surface are set to be 0.3 or more based on a third example, which will be described later. When the friction coefficients between the surface of the electrical steel sheets that are subject to the punching and the mold surfaces making contact with the surface of the electrical steel sheets are too high, the electrical steel sheets are not smoothly transported in the mold 3, and the iron loss of the iron core after the punching is deteriorated. For preventing this, the static friction coefficients are limited to be 0.8 or less.

Steel Components of Electrical Steel Sheets: Si: 0.5 to 6.6%, Al: 2.5% or Less, Mn: 0.1 to 3.0%

In the embodiment, contents of Si, Al, and Mn as steel components of the electrical steel sheets as the base material of the iron core are set to 0.5 to 6.6%, 2.5% or less, and 0.1 to 3.0%, respectively, in terms of mass ratio based on a fourth example, which will be described later. These contents of the steel components form a base satisfying the Vickers hardness of the material that is 150 or more and accelerates formation of the inclusions in the steel. The effects provided by the Vickers hardness are as described above. Effects provided by the inclusions in the steel will be described later.

Si is an element that increases a specific resistance of the steel and thereby lowers eddy current loss to contribute to decrease in the iron loss. When the additive amount (content) thereof is lower than 0.5% in terms of mass ratio, it is difficult to increase the Vickers hardness to be 150 or more without involving the deterioration of the iron loss of the material even when other components (Al, Cr, and the like) are added. The content of Si is therefore limited to be 0.5% or more. When the content of Si is higher than 6.6% in terms of mass ratio, it is difficult to perform the punching in a state in which two sheets or more are stacked due to embrittlement of the base material. The content of Si is therefore limited to be 0.5 to 6.6% in terms of mass ratio.

Al is an element that increases the specific resistance of the steel to contribute to decrease in the iron loss in the same manner as Si. Al forms inclusions such as AlN and $Al_2O_3$ in the steel and contributes to acceleration of the breakage during the punching as will be described later. When Al is excessively added, the amount of precipitates in the steel are excessively increased and the iron loss is deteriorated. The content of Al is therefore limited to be 2.5% or less in terms of mass ratio.

Mn has a function of increasing the specific resistance of the steel and preventing red embrittlement in hot rolling. Furthermore, Mn forms MnS in the steel and contributes to improvement in punching workability as will be described later. In order to provide these effects, the content of Mn needs to be set to be 0.1% or more in terms of mass ratio. When the content of Mn is higher than 3.0% in terms of mass ratio, lowering in a magnetic flux density becomes significant. The content of Mn is therefore limited to be 0.1 to 3.0% in terms of mass ratio.

In addition, presence of S, Se, Cu, Ti, Nb, and N as in-steel additive elements or impurities in the steel is effective in order to form the precipitates satisfying the requirements of the present invention. Furthermore, addition of Sb, Sn, Cr, P, and the like into the steel is also recommended for trying to decreasing the iron loss from a viewpoint of improvement in the iron loss without reducing the iron loss deterioration prevention effect of the present invention.

Number of Inclusions in Steel: Inclusions 1000 to 8000 pieces/$mm^2$ Having Grain size of 0.1 to 3.0 μm In the embodiment, when the steel sheets are subject to the punching in the stacked state, in addition to the above-mentioned requirements, the number of inclusions having the grain size of 0.1 to 3.0 μm in the steel is set to 1000 to 8000 pieces/$mm^2$ based on the fourth example, which will be described later. This setting decreases the iron loss of the iron core after the punching. This is because when the steel sheets are drawn into the die hole 6 and are broken during the punching, the steel sheets are broken from the inclusions as crack generation origins at an early stage in the punching process and the amount of strain remaining in the iron core after the punching is decreased as in the study for the hardness of the steel sheets.

When the number of inclusions having the grain size of 0.1 to 3.0 μm is smaller than 1000 pieces/$mm^2$, the above-mentioned effects are not provided. When the number of inclusions is larger than 8000 pieces/$mm^2$, the steel sheets themselves are deteriorated in the magnetic characteristics. When the inclusions having the grain size of 0.1 to 3.0 μm are sufficiently ensured, the above-mentioned effects can be provided while decreasing the deterioration in the magnetic characteristics of the steel sheets to the minimum. Based on these requirements, the grain size and the number of inclusions are limited to be the above-mentioned ranges.

The content of the precipitates can be calculated by observing the cross section (at approximately ¼ sheet thickness) of the base material steel sheets, counting the grain size and the number of inclusions in an observation visual field, and dividing the number of inclusions in a region matching with the grain size range by the area of the observation visual field.

Although techniques of improving punching performance and cutting performance by adjusting the amount of precipitates in the electrical steel sheets have been known, all of these techniques are intended to improve abrasion resistance of tools and do not examine the prevention of the deterioration in the magnetic characteristics. Furthermore, the steel sheets having preferable characteristics as products as a result of appropriate control of inclusion dispersion at a steel manufacturing stage have also been disclosed. None of them is however led to the improvement in the iron loss after the punching in the state in which the steel sheets are stacked as in the present invention.

Laminated Iron Core Manufacturing Method

The iron core element pieces provided by the punching process that satisfies the above-mentioned requirements are laminated and integrated with one another to manufacture a laminated iron core for a motor or a generator.

As a method for integrating the iron core element pieces, there is a method (what is called in-mold interlocking) in which the iron core element pieces are separated from the base material after the punching in the mold 3, and then, are subject to interlocking in the mold 3 lowered by the punch 4. This method is excellent in manufacturing performance. As another method, a method in which only dowels for interlocking are formed in the punching process in the mold 3 and a device other than the mold 3 for punching applies pressure after the punching for interlocking may be employed. Furthermore, a method in which only the punching is performed in the mold 3 and the iron core element pieces are integrated with one another by welding, fixing with bolts, coating of an adhesive, or application of adhesive coating outside the mold 3 may be employed. Alternatively, a method in which an adhesive is applied to the electrical steel sheet surfaces and the iron core element pieces are made to adhere to each other and are punched instead of interlocking in the mold 3 can also be applied to the invention.

EXAMPLES

Hereinafter, examples of the present invention will be described. Among the examples below, those that satisfy the requirements of the present invention correspond to inventive examples and those that do not satisfy the requirements of the present invention correspond to comparative examples.

First Example

Figure 2:
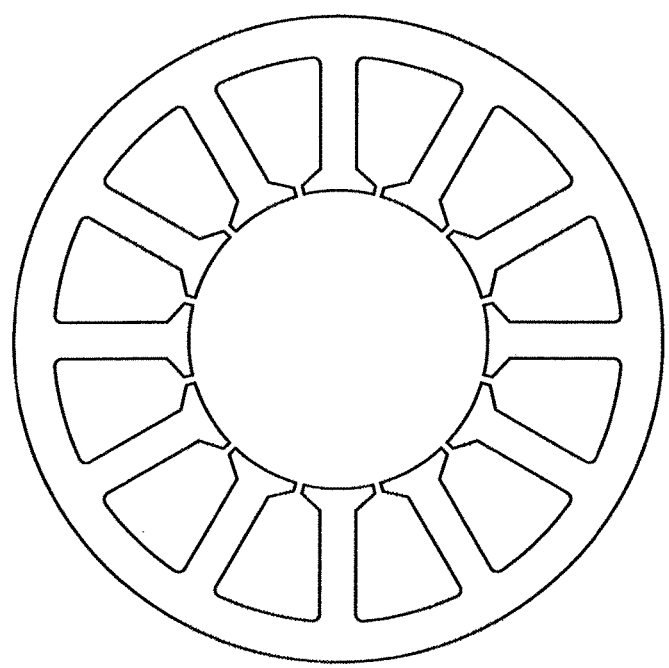
FIG. 2 is a view illustrating a laminated iron core that is manufactured in the embodiment.

Two steel strip coils for punching work that were provided by slitting an electrical steel sheet coil containing Si of 3.0%, Al of 0.8%, Mn of 0.7%, and P of 0.03% in terms of mass ratio in steel and having a sheet thickness of 0.25 mm so as to have widths of 160 mm were prepared as the base material steel sheets. The two steel strip coils (C1 and C2) were simultaneously subject to the punching using the punching device 10 illustrated in FIG. 1 (work method: punching of two stacked sheets). The iron core element pieces provided by the punching were subject to interlocking in the mold 3 to manufacture a stator iron core for a brushless DC motor (motor core) illustrated in FIG. 2.

The clearance (one side) a in the punching was made to vary in a range of 2 to 15% relative to the total sheet thickness of 0.50 mm of the two electrical steel sheets. The pressure (sheet presser pressure) that the sheet presser 8 applies to the electrical steel sheets in the mold 3 was made to vary in a range of 0.05 to 1.0 MPa. The Vickers hardness (test force 1 kg) of the used electrical steel sheets was set to 195, the average crystal grain size was set to 80 μm, the static friction coefficient between the steel sheets was set to 0.2, and the static friction coefficient between the steel sheets and the mold 3 (the sheet presser 8 and the die plate 7) was set to 0.25.

As a reference example, one electrical steel sheet under the same conditions as those in the above-mentioned example (Inventive Example) except that the sheet thickness was set to 0.50 mm was punched out without being stacked (work method: punching of one sheet). In order to evaluate the deterioration ratio of the iron loss by the punching, a motor core having the same dimensions was manufactured by wire cutting (work method: wire cutting).

Figure 3:
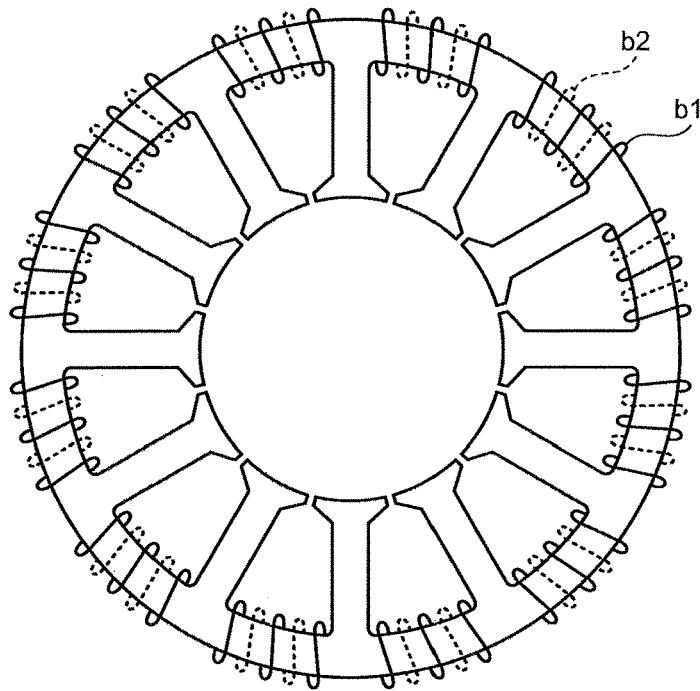
FIG. 3 is a view for explaining a method for evaluating magnetic characteristics (iron loss) of the laminated iron core that is manufactured in the embodiment.

In order to simply evaluate the iron loss of the manufactured motor core (core iron loss), a magnetic circuit was formed by winding a primary coil for excitation b1 and a secondary coil for magnetic flux measurement b2 around a core back portion as illustrated in FIG. 3 and the core iron loss was evaluated by measuring magnetism. Table 1 indicates the above-mentioned conditions and evaluation results of the core iron loss.

TABLE 1

| Number | Sheet thickness (mm) | Hardness (HV) | Crystal grain size (μm) | Method | Clearance (μm) | Ratio of clearance relative to steel sheet of minimum sheet thickness (%) | Ratio of clearance relative to total sheet thickness (%) | Sheet presser pressure (MPa) | Core iron loss (W/kg) | Iron loss deterioration ratio (%) | Note |
|---|---|---|---|---|---|---|---|---|---|---|---|
| 1 | 0.25 | 195 | 80 | Wire cutting | — | — | — | — | 12.0 | — | Reference example |
| 2 | | | | Punching of two | 11.5 | 4.6 | 2.3 | 0.35 | 14.3 | 19.2 | Comparative example |
| 3 | | | | | 17.5 | 7.0 | 3.5 | 0.35 | 13.7 | 14.2 | Inventive example |

TABLE 1-continued

| Number | Sheet thickness (mm) | Hardness (HV) | Crystal grain size (μm) | Method | Clearance (μm) | Ratio of clearance relative to steel sheet of minimum sheet thickness (%) | Ratio of clearance relative to total sheet thickness (%) | Sheet presser pressure (MPa) | Core iron loss (W/kg) | Iron loss deterioration ratio (%) | Note |
|---|---|---|---|---|---|---|---|---|---|---|---|
| 4 | | | | stacked | 25 | 10 | 5.0 | 0.35 | 13.7 | 14.2 | Inventive example |
| 5 | | | | sheets | 35 | 14 | 7.0 | 0.35 | 13.8 | 15.0 | Inventive example |
| 6 | | | | | 45 | 18 | 9.0 | 0.35 | 14.4 | 20.0 | Comparative example |
| 7 | | | | | 60 | 24 | 12 | 0.35 | 14.8 | 23.3 | Comparative example |
| 8 | | | | | 25 | 10 | 5.0 | 0.05 | 14.9 | 24.2 | Comparative example |
| 9 | | | | | 25 | 10 | 5.0 | 0.07 | 14.7 | 22.5 | Comparative example |
| 10 | | | | | 25 | 10 | 5.0 | 0.10 | 13.8 | 15.0 | Inventive example |
| 11 | | | | | 25 | 10 | 5.0 | 0.30 | 13.7 | 14.2 | Inventive example |
| 12 | | | | | 25 | 10 | 5.0 | 0.80 | 13.7 | 14.2 | Inventive example |
| 13 | | | | | 25 | 10 | 5.0 | 1.2 | 13.8 | 15.0 | Inventive example |
| 14 | | | | | 25 | 10 | 5.0 | 1.5 | 13.9 | 15.8 | Inventive example |
| 15 | | | | | 25 | 10 | 5.0 | 2.0 | 13.9 | 15.8 | Inventive example |
| 16 | 0.50 | 195 | 80 | Wire cutting | — | — | — | — | 23.0 | — | Reference example |
| 17 | | | | Punching | 12.5 | 5.0 | 2.5 | 0.35 | 25.2 | 9.6 | Reference example |
| 18 | | | | of single | 17.5 | 7.0 | 3.5 | 0.35 | 25.2 | 9.6 | Reference example |
| 19 | | | | sheet | 25 | 10 | 5.0 | 0.35 | 25.3 | 10.0 | Reference example |
| 20 | | | | | 35 | 14 | 7.0 | 0.35 | 25.5 | 10.9 | Reference example |
| 21 | | | | | 45 | 18 | 9.0 | 0.35 | 25.8 | 12.2 | Reference example |
| 22 | | | | | 60 | 24 | 12 | 0.35 | 26.5 | 15.2 | Reference example |
| 23 | | | | | 25 | 10 | 5.0 | 0.05 | 25.4 | 10.4 | Reference example |
| 24 | | | | | 25 | 10 | 5.0 | 0.07 | 25.3 | 9.8 | Reference example |
| 25 | | | | | 25 | 10 | 5.0 | 0.10 | 25.3 | 9.8 | Reference example |
| 26 | | | | | 25 | 10 | 5.0 | 0.30 | 25.2 | 9.6 | Reference example |
| 27 | | | | | 25 | 10 | 5.0 | 0.80 | 25.2 | 9.6 | Reference example |
| 28 | | | | | 25 | 10 | 5.0 | 1.2 | 25.2 | 9.6 | Reference example |
| 29 | | | | | 25 | 10 | 5.0 | 1.5 | 25.2 | 9.6 | Reference example |
| 30 | | | | | 25 | 10 | 5.0 | 2.0 | 25.3 | 9.8 | Reference example |

Figure 4:
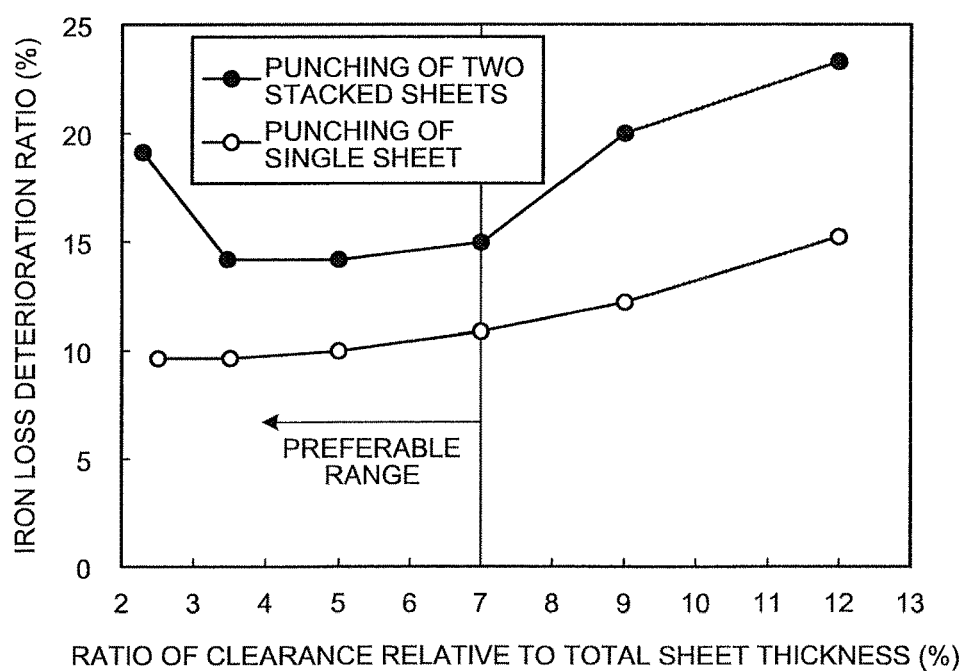
FIG. 4 is a graph illustrating a relation between a clearance and an iron loss deterioration ratio in a first example.

FIG. 4 is a graph illustrating a relation between the clearance a of the mold 3 for the punching and the iron loss deterioration ratio expressed by the above-mentioned equation (1). As illustrated in FIG. 4, it was found that in the case of the punching to one sheet, the iron loss deterioration ratio was lowered with reduction in the clearance a. On the other hand, it was found that in the case of the punching to two stacked sheets, the iron loss deterioration ratio was significantly lowered when the clearance a was set to 3.5 to 7% of the total sheet thickness of the two electrical steel sheets. It was also found that in the case of the punching to two stacked sheets, the iron loss deterioration ratio was higher than that in the case of the punching to one sheet even under the above-mentioned conditions, resulting in that future challenges were left.

Figure 5:
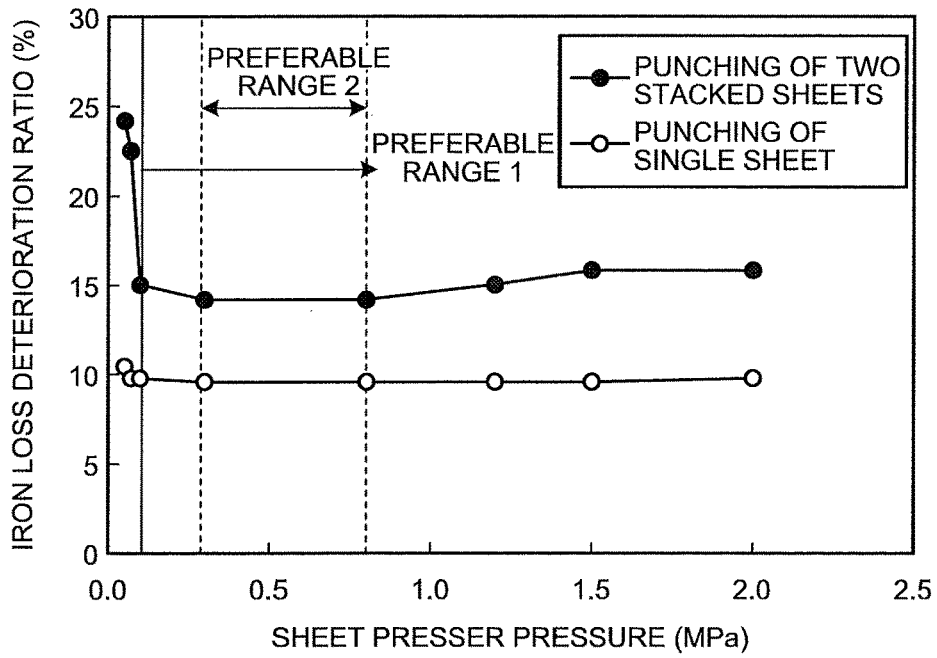
FIG. 5 is a graph illustrating a relation between a sheet presser pressure and the iron loss deterioration ratio in the first example.

FIG. 5 is a graph illustrating a relation between the sheet presser pressure and the iron loss deterioration ratio. As illustrated in FIG. 5, in the case of the punching to one sheet, the iron loss deterioration ratio hardly depends on the sheet presser pressure. On the other hand, it was found that in the case of the punching to two stacked sheets, the iron loss deterioration ratio was lowered when the sheet presser pressure was controlled to be in a range of 0.10 MPa or more (desirably 0.30 to 0.80 MPa).

Second Example

Steel strip coils for punching work that were provided slitting electrical steel sheet coils having different crystal grain sizes with varied contents of Si, Al, Mn, and P in steel and having sheet thicknesses of 0.35 mm, 0.25 mm, 0.20 mm, and 0.15 mm so as to have widths of 160 mm were prepared as the base material steel sheets. The two steel strip coils (C1 and C2) of a varied combination among them were simultaneously subject to the punching using the punching device 10 illustrated in FIG. 1. Outer peripheral portions of the iron core element pieces provided by the punching were welded to manufacture a stator iron core for a brushless DC motor (motor core). The clearance (one side) a in the punching was set to 25 μm (5% of the total sheet thickness of the two sheets) and the pressure (sheet presser pressure) that the sheet presser 8 applies to the material in the mold 3 was set to 0.35 MPa.

As a comparative example, in order to evaluate deterioration in the magnetic characteristics (iron loss) due to the punching, a motor core having the same dimensions as those in the example (inventive example) was manufactured by wire cutting (work method: wire cutting).

The iron loss of the manufactured motor core (core iron loss) was evaluated by simply measuring magnetism using the magnetic circuit illustrated in FIG. 3. Table 2 indicates the above-mentioned conditions and evaluation results of the core iron loss.

TABLE 2

| Number | C1 Sheet thickness (mm) | C2 Sheet thickness (mm) | Clearance (μm) | Ratio of clearance relative to steel sheet of minimum sheet thickness (%) | Ratio of clearance relative to total sheet thickness | Sheet presser pressure (MPa) | Crystal grain size (μm) | Hardness (Hv) | Wire cutting core iron loss | Core iron loss (W/kg) | Iron loss deterioration ratio relative to wire cutting (%) | Note |
|---|---|---|---|---|---|---|---|---|---|---|---|---|
| 1 | 0.35 | — | 25 | 7.1 | 7.1 | 0.30 | 100 | 190 | 20.3 | 21.8 | 7.4 | Reference example |
| 2 | 0.35 | — | 25 | 7.1 | 7.1 | 0.30 | 100 | 400 | 9.8 | 10.1 | 3.1 | Reference example |
| 3 | 0.35 | — | 25 | 7.1 | 7.1 | 0.30 | 100 | 300 | 12.1 | 12.8 | 5.8 | Reference example |
| 4 | 0.35 | — | 25 | 7.1 | 7.1 | 0.30 | 100 | 230 | 17.0 | 18.2 | 7.1 | Reference example |
| 5 | 0.35 | — | 25 | 7.1 | 7.1 | 0.30 | 100 | 150 | 24.8 | 27.2 | 9.7 | Reference example |
| 6 | 0.35 | — | 25 | 7.1 | 7.1 | 0.30 | 100 | 130 | 26.1 | 29.1 | 11.5 | Reference example |
| 7 | 0.35 | — | 25 | 7.1 | 7.1 | 0.30 | 100 | 100 | 29.8 | 33.6 | 12.8 | Reference example |
| 8 | 0.35 | 0.35 | 35 | 10.0 | 5.0 | 0.30 | 30 | 190 | 26.4 | 28.8 | 9.1 | Comparative example |
| 9 | 0.35 | 0.35 | 35 | 10.0 | 5.0 | 0.30 | 100 | 140 | 25.4 | 30.3 | 19.3 | Comparative example |
| 10 | 0.35 | 0.35 | 35 | 10.0 | 5.0 | 0.30 | 100 | 190 | 22.5 | 26.2 | 16.4 | Inventive example |
| 11 | 0.35 | 0.35 | 15 | 4.3 | 2.1 | 0.30 | 100 | 190 | 22.5 | 26.9 | 19.6 | Comparative example |
| 12 | 0.35 | 0.35 | 55 | 15.7 | 7.9 | 0.30 | 100 | 190 | 22.5 | 27.5 | 22.2 | Comparative example |
| 13 | 0.35 | 0.35 | 35 | 10.0 | 5.0 | 0.06 | 100 | 190 | 22.5 | 28.4 | 26.2 | Comparative example |
| 14 | 0.20 | 0.20 | 20 | 10.0 | 5.0 | 0.30 | 100 | 190 | 11.1 | 12.7 | 14.4 | Inventive example |
| 15 | 0.20 | 0.20 | 20 | 10.0 | 5.0 | 0.30 | 50 | 190 | 11.5 | 13.2 | 14.8 | Inventive example |
| 16 | 0.20 | 0.20 | 20 | 10.0 | 5.0 | 0.30 | 30 | 190 | 12.2 | 14.2 | 16.4 | Comparative example |
| 17 | 0.20 | 0.20 | 20 | 10.0 | 5.0 | 0.30 | 200 | 190 | 10.6 | 12.2 | 14.6 | Inventive example |
| 18 | 0.20 | 0.20 | 20 | 10.0 | 5.0 | 0.30 | 250 | 190 | 10.5 | 12.4 | 18.1 | Inventive example |
| 19 | 0.20 | 0.20 | 20 | 10.0 | 5.0 | 0.30 | 300 | 190 | 10.4 | 13.2 | 26.9 | Comparative example |
| 20 | 0.20 | 0.20 | 20 | 10.0 | 5.0 | 0.30 | 200 | 190 | 10.6 | 12.3 | 15.5 | Inventive example |
| 21 | 0.20 | 0.20 | 20 | 10.0 | 5.0 | 0.30 | 190 | 400 | 9.7 | 11.1 | 14.4 | Inventive example |
| 22 | 0.20 | 0.20 | 20 | 10.0 | 5.0 | 0.30 | 190 | 300 | 9.8 | 11.3 | 15.3 | Inventive example |
| 23 | 0.20 | 0.20 | 20 | 10.0 | 5.0 | 0.30 | 190 | 230 | 10.2 | 11.8 | 15.7 | Inventive example |
| 24 | 0.20 | 0.20 | 20 | 10.0 | 5.0 | 0.30 | 190 | 150 | 11.6 | 13.6 | 17.2 | Inventive example |
| 25 | 0.20 | 0.20 | 20 | 10.0 | 5.0 | 0.30 | 190 | 130 | 12.2 | 14.8 | 21.3 | Comparative example |
| 26 | 0.20 | 0.20 | 20 | 10.0 | 5.0 | 0.30 | 190 | 100 | 12.8 | 16.2 | 26.6 | Comparative example |
| 27 | 0.20 | 0.20 | 20 | 10.0 | 5.0 | 0.07 | 300 | 184 | 10.4 | 13.3 | 27.9 | Comparative example |
| 28 | 0.20 | 0.20 | 20 | 10.0 | 5.0 | 0.07 | 250 | 180 | 10.5 | 13.2 | 25.7 | Comparative example |
| 29 | 0.20 | 0.20 | 20 | 10.0 | 5.0 | 0.07 | 200 | 184 | 10.6 | 13.2 | 24.1 | Comparative example |
| 30 | 0.20 | 0.20 | 20 | 10.0 | 5.0 | 0.07 | 100 | 190 | 11.1 | 13.6 | 22.5 | Comparative example |
| 31 | 0.20 | 0.20 | 20 | 10.0 | 5.0 | 0.07 | 50 | 197 | 11.5 | 14.0 | 21.7 | Comparative example |
| 32 | 0.20 | 0.20 | 20 | 10.0 | 5.0 | 0.07 | 30 | 198 | 12.2 | 14.8 | 21.3 | Comparative example |
| 33 | 0.20 | 0.20 | 32 | 16.0 | 8.0 | 0.30 | 190 | 230 | 10.2 | 12.6 | 23.5 | Comparative example |
| 34 | 0.20 | 0.20 | 32 | 16.0 | 8.0 | 0.30 | 190 | 300 | 9.8 | 12.0 | 22.4 | Comparative example |
| 35 | 0.20 | 0.20 | 32 | 16.0 | 8.0 | 0.30 | 190 | 400 | 9.7 | 11.7 | 20.6 | Comparative example |
| 36 | 0.20 | 0.20 | 20 | 10.0 | 8.0 | 0.30 | 190 | 190 | 10.6 | 13.1 | 23.6 | Comparative example |
| 37 | 0.15 | 0.15 | 15 | 10.0 | 5.0 | 0.30 | 100 | 190 | 10.0 | 11.3 | 13.0 | Inventive example |
| 38 | 0.10 | 0.25 | 28 | 28.0 | 8.0 | 0.30 | 100 | 190 | 11.1 | 13.9 | 25.2 | Comparative example |
| 39 | 0.10 | 0.25 | 24.5 | 24.5 | 7.0 | 0.30 | 100 | 190 | 11.1 | 12.9 | 16.2 | Inventive example |
| 40 | 0.10 | 0.25 | 20 | 20.0 | 5.7 | 0.30 | 100 | 190 | 11.1 | 12.8 | 15.3 | Inventive example |
| 41 | 0.10 | 0.25 | 10.5 | 10.5 | 3.0 | 0.30 | 100 | 190 | 11.1 | 12.7 | 14.4 | Inventive example |
| 42 | 0.10 | 0.25 | 9.0 | 9.0 | 2.6 | 0.30 | 100 | 190 | 11.1 | 12.7 | 14.4 | Inventive example |
| 43 | 0.10 | 0.25 | 6.0 | 6.0 | 1.7 | 0.30 | 100 | 190 | 11.1 | 13.5 | 21.6 | Comparative example |
| 44 | 0.15 | 0.20 | 28 | 18.7 | 8.0 | 0.30 | 100 | 190 | 10.6 | 13.6 | 27.7 | Comparative example |
| 45 | 0.15 | 0.20 | 24.5 | 16.3 | 7.0 | 0.30 | 100 | 190 | 10.6 | 12.3 | 15.5 | Inventive example |
| 46 | 0.15 | 0.20 | 20 | 13.3 | 5.7 | 0.30 | 100 | 190 | 10.6 | 12.2 | 14.6 | Inventive example |
| 47 | 0.15 | 0.20 | 10.5 | 7.0 | 3.0 | 0.30 | 100 | 190 | 10.6 | 12.4 | 16.5 | Inventive example |
| 48 | 0.15 | 0.20 | 9.0 | 6.0 | 2.6 | 0.30 | 100 | 190 | 10.6 | 13.2 | 24.0 | Comparative example |
| 49 | 0.15 | 0.20 | 6.0 | 4.0 | 1.7 | 0.30 | 100 | 190 | 10.6 | 13.3 | 24.9 | Comparative example |
| 50 | 0.25 | 0.25 | 25 | 10.0 | 5.0 | 0.30 | 100 | 190 | 15.8 | 17.9 | 14.9 | Inventive example |

Figure 6:
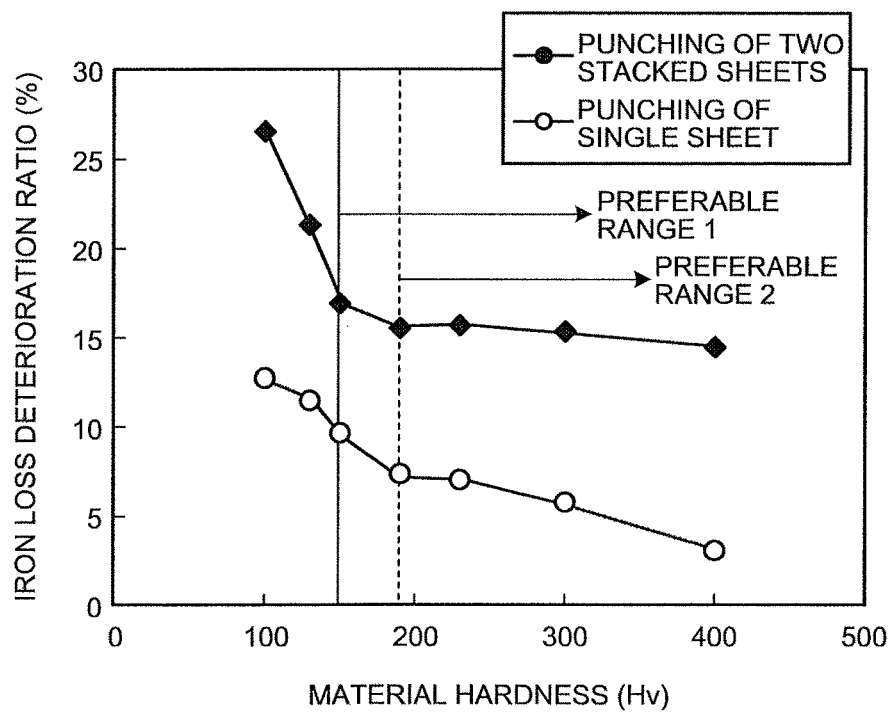
FIG. 6 is a graph illustrating a relation between a hardness of electrical steel sheets and an iron loss deterioration ratio of a motor core in a second example.
Figure 7:
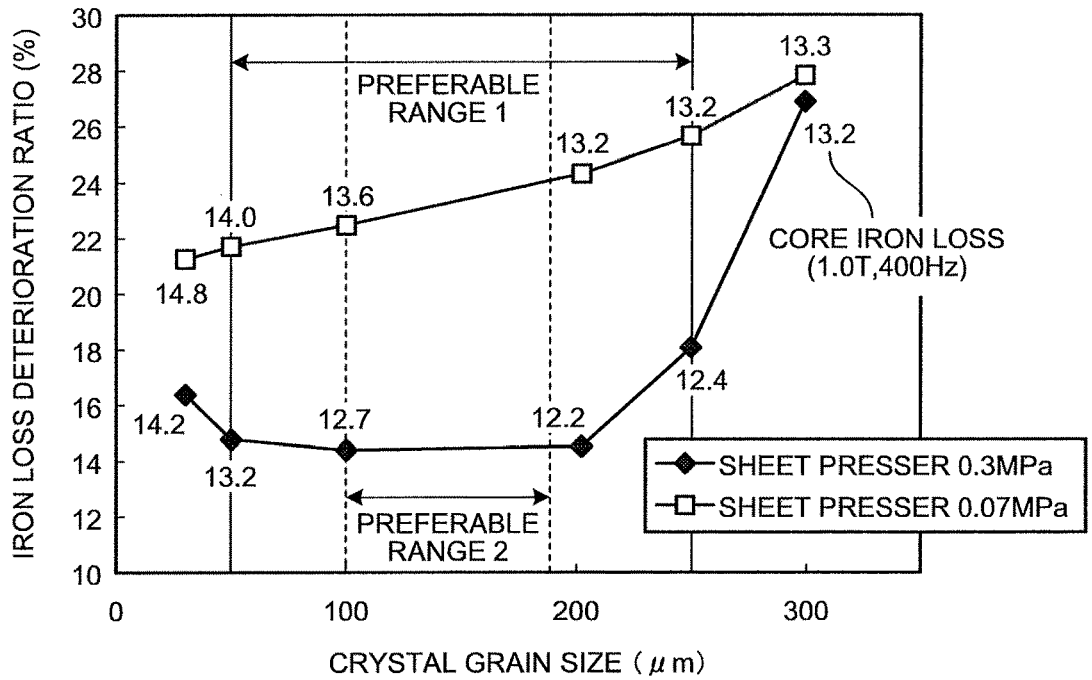
FIG. 7 is a graph illustrating a relation between a crystal grain size of the electrical steel sheets and the iron loss deterioration ratio of the motor core in the second example.

FIG. 6 is a graph illustrating a relation between the hardness of the electrical steel sheets and the iron loss deterioration ratio of the motor core. FIG. 7 is a graph illustrating a relation between the crystal grain size of the electrical steel sheets and the iron loss deterioration ratio of the motor core. It should be noted that the iron loss deterioration ratio in FIG. 6 and FIG. 7 indicates an increase ratio of the iron loss of the motor core (core iron loss) in the example relative to the iron loss of the motor core (wire cutting core iron loss) manufactured by wire cutting.

As illustrated in FIG. 6 and FIG. 7, it was found that when the hardness and the crystal grain size satisfied the requirements in the above-mentioned embodiment (inventive example), the iron loss deterioration ratio was lowered and increase (deterioration) in the iron loss was decreased. On the other hand, it was found that when the hardness and the crystal grain size did not satisfy the requirements in the above-mentioned embodiment, the iron loss deterioration ratio was higher than 17%.

Comparison of examples indicated in numbers of 10, 14, 37, and 50 in Table 2 that employ the equivalent electrical steel sheets and work method revealed that the iron loss deterioration ratio in the punching of two stacked sheets was lower when the sheet thicknesses were 0.25 mm, 0.20 mm, or 0.15 mm than that when the sheet thickness was 0.35 mm. Based on this finding, usage of the electrical steel sheet having the sheet thickness of 0.25 mm or less is advantageous when the technique of the present invention is applied.

Furthermore, it was found that when the electrical steel sheets (steel strip coils) having different sheet thicknesses were combined and were subject to the punching, increase in the iron loss due to the punching was decreased by setting the clearance a to be 7% or more of the minimum sheet thickness and 7% or less of the total sheet thickness.

Third Example

A static friction coefficient of the surface of an electrical steel sheet coil containing Si of 3.0%, Al of 0.8%, Mn of As a reference example, in order to evaluate deterioration in the magnetic characteristics (iron loss) due to the punching, a motor core having the same dimensions as those in the example (inventive example) was manufactured by wire cutting (work method: wire cutting).

The iron loss of the manufactured motor core (core iron loss) was evaluated by simply measuring magnetism using the magnetic circuit illustrated in FIG. 3. Table 3 indicates the above-mentioned conditions and evaluation results of the core iron loss.

TABLE 3

| Number | Work method | Clearance (μm) | Ratio of clearance relative to steel sheet of minimum sheet thickness (%) | Ratio of clearance relative to total sheet thickness (%) | Sheet presser pressure (MPa) | Static friction coefficient (between steel sheets) | Static friction coefficient (Mold) | Core iron loss (W/kg) | Iron loss deterioration ratio (%) | Note |
|---|---|---|---|---|---|---|---|---|---|---|
| 1 | Wire cutting | — | — | — | — | 0.50 | 0.46 | 9.0 | — | Reference example |
| 2 | Punching (0.10 mm × 3) | 15 | 10 | 4.3 | 0.50 | 0.15 | 0.12 | 11.5 | 28.1 | Inventive example |
| 3 |  | 15 | 10 | 4.3 | 0.50 | 0.25 | 0.23 | 11.3 | 25.1 | Inventive example |
| 4 |  | 15 | 10 | 4.3 | 0.50 | 0.30 | 0.27 | 11.2 | 24.1 | Inventive example |
| 5 |  | 15 | 10 | 4.3 | 0.50 | 0.40 | 0.35 | 10.9 | 21.1 | Inventive example |
| 6 |  | 15 | 10 | 4.3 | 0.50 | 0.50 | 0.46 | 10.8 | 20.1 | Inventive example |
| 7 |  | 15 | 10 | 4.3 | 0.50 | 0.60 | 0.56 | 10.7 | 19.1 | Inventive example |
| 8 |  | 15 | 10 | 4.3 | 0.50 | 0.80 | 0.66 | 10.8 | 20.1 | Inventive example |
| 9 |  | 15 | 10 | 4.3 | 0.50 | 0.15 | 0.19 | 11.4 | 27.1 | Inventive example |
| 10 |  | 15 | 10 | 4.3 | 0.50 | 0.25 | 0.26 | 11.3 | 25.1 | Inventive example |
| 11 |  | 15 | 10 | 4.3 | 0.50 | 0.30 | 0.33 | 10.9 | 21.1 | Inventive example |
| 12 |  | 15 | 10 | 4.3 | 0.50 | 0.40 | 0.44 | 10.8 | 20.1 | Inventive example |
| 13 |  | 15 | 10 | 4.3 | 0.50 | 0.50 | 0.54 | 10.7 | 19.1 | Inventive example |
| 14 |  | 15 | 10 | 4.3 | 0.50 | 0.60 | 0.80 | 10.7 | 19.1 | Inventive example |
| 15 |  | 15 | 10 | 4.3 | 0.50 | 0.80 | 0.91 | 11.1 | 23.1 | Inventive example |
| 16 |  | 27 | 18 | 7.7 | 0.50 | 0.40 | 0.44 | 12.3 | 36.7 | Comparative example |
| 17 |  | 27 | 18 | 7.7 | 0.50 | 0.15 | 0.12 | 12.5 | 39.1 | Comparative example |
| 18 |  | 7 | 4.7 | 2.0 | 0.50 | 0.40 | 0.44 | 12.3 | 36.1 | Comparative example |
| 19 |  | 15 | 1.0 | 4.3 | 0.06 | 0.40 | 0.44 | 12.6 | 40.1 | Comparative example |

0.7%, and P of 0.03% in terms of mass ratio in steel, having the Vickers hardness (measured with a weight of 1 kg) of 195, having a crystal grain size of 100 μm, and having a sheet thickness of 0.10 mm was made to vary. The static friction coefficient was made to vary by causing compositions (resin blending ratio and wax addition amount) of chromic acid-resin based coating to vary. Three steel strip coils (C1 to C3) having widths of 160 mm were prepared from the electrical steel sheet coil. The three steel strip coils were simultaneously subject to the punching using the punching device 10 illustrated in FIG. 1 (work method: punching). The iron core element pieces provided by the punching were subject to interlocking in the mold 3 to manufacture a stator iron core for a brushless DC motor (motor core). The clearance (one side) a in the punching was set to 15 μm (4.3% of the total sheet thickness 0.35 mm), and the sheet presser pressure was set to 0.06 to 0.5 MPa.

In the mold 3 for the punching, roughness of a portion (mold surface 1) of the die plate 7 that makes contact with the electrical steel sheets and roughness of a portion (mold surface 2) of the sheet presser 8 that makes contact with the electrical steel sheets were made to vary to cause the static friction coefficient between the mold 3 and the electrical steel sheets to vary.

Figure 8:
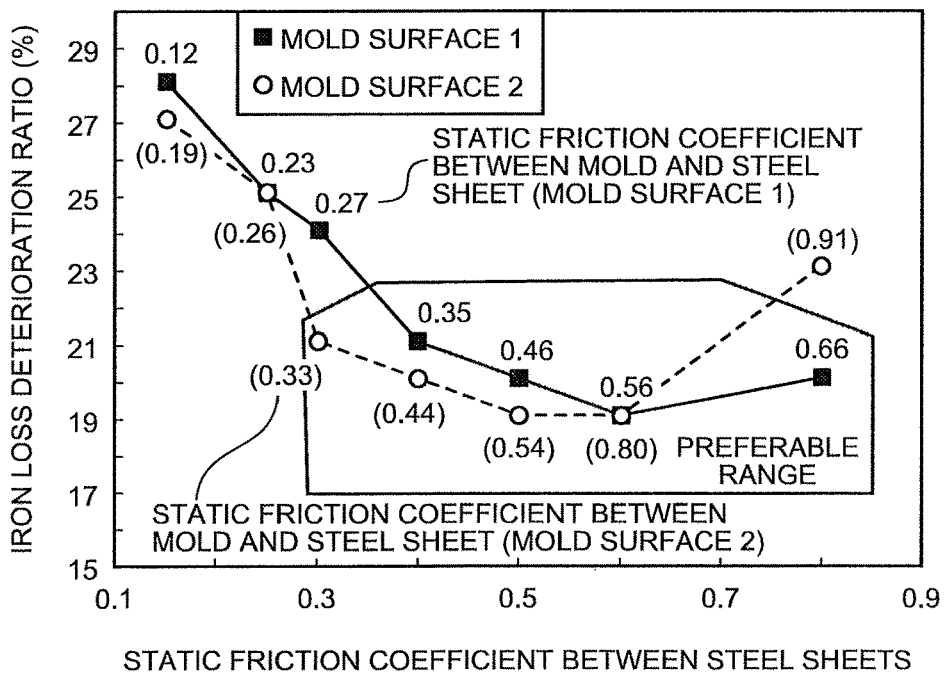
FIG. 8 is a graph illustrating a relation between a static friction coefficient between electrical steel sheets and an iron loss deterioration ratio of a motor core in a third example.

FIG. 8 is a graph illustrating a relation between the static friction coefficient between the steel sheets and the iron loss deterioration ratio of the motor core. As illustrated in Table 3 and FIG. 8, it was found that in the example, the three steel sheets were simultaneously punched out and the iron loss deterioration ratio was therefore higher than that when the two steel sheets were simultaneously punched out but the iron loss deterioration ratio of the iron core manufactured by wire cutting was lowered by satisfying the requirements of the present invention. In particular, as illustrated in FIG. 8, it was found that the iron loss deterioration ratio was stably lowered to be 21% or lower by setting the static friction coefficient between the steel sheets to be 0.3 or more and setting the static friction coefficient between the steel sheets and the mold 3 to be in a range of 0.3 to 0.8.

Fourth Example

The size and the number of inclusions in steel were adjusted by adjusting degassing process time and a molten steel refluxing speed when manufacturing a steel slab. Then, the contents of Si, Al, Mn, and other elements were adjusted by component adjustment in a degassing process. Subsequently, continuous casting, hot rolling, hot rolled sheet annealing and pickling, and cold rolling were performed and a sheet thickness was set to 0.15 mm. Thereafter, an electrical steel sheet coil was manufactured by finish annealing and coating application. Two steel strip coils (C1 and C2) having widths of 160 mm were prepared from the electrical steel sheet coil.

Conditions of the coating application were the same as those for both of the steel strip coils. The static friction coefficient between the steel sheets was set to 0.4 and the static friction coefficient between the steel sheets and the mold 3 (surfaces making contact with the steel sheets) was set to 0.4. The crystal grain size, the hardness, and the number of inclusions in steel were investigated for these steel strip coils C1 and C2.

Thereafter, the two steel strip coils were simultaneously subject to the punching using the punching device 10 illustrated in FIG. 1 (work method: punching of two stacked sheets). The iron core element pieces provided by the punching were subject to interlocking in the mold 3 to manufacture a stator iron core for a brushless DC motor (motor core). The clearance (one side) a in the punching was set to 12 μm (4% of the total sheet thickness of the two sheets) and the sheet presser pressure was set to 0.40 MPa. The ratio of the clearance a relative to the steel sheet having the minimum sheet thickness was 8% and the ratio of the clearance a relative to the total sheet thickness was 4%.

The iron loss of the manufactured motor core (core iron loss) was evaluated by simply measuring magnetism using the magnetic circuit illustrated in FIG. 3. Table 4 indicates the above-mentioned conditions and evaluation results of the core iron loss.

the laminated iron core for a high-efficient rotating equipment of a motor or a generator can be manufactured from an electrical steel sheet having a small sheet thickness highly efficiently.

Hereinbefore, the embodiment to which the invention made by the present inventors is applied has been described. The description and the drawings in the embodiment that form a part of the disclosure of the present invention do not limit the present invention. That is to say, all of other embodiments, examples, operation techniques, and the like that are made by those skilled in the art based on the embodiment are encompassed in the scope of the invention.

As described above, the punching method, the punching device, and the laminated iron core manufacturing method according to the present invention are useful for the punching to the steel sheet that is used for the iron core and manufacturing of the laminated iron core, and in particular, are suitable for the punching method, the punching device, and the laminated iron core manufacturing method capable of simultaneously punching a plurality of stacked electrical steel sheets while decreasing deterioration in iron loss to the minimum.

TABLE 4

| Number | Si (mass %) | Al (mass %) | Mn (mass %) | Others (mass %) | Crystal gain size (μm) | Number of inclusions in steel having grain size of 0.1 to 3.0 μm (number/mm$^2$) | Hardness (Hv) | Wire cutting core iron loss (W/kg) | Core iron loss (W/kg) | Iron loss deterioration ratio (%) | Note |
|---|---|---|---|---|---|---|---|---|---|---|---|
| 1 | 6.5 | 0.001 | 0.2 | | 220 | 2000 | 400 | 6.6 | 7.1 | 7.6 | Inventive example |
| 2 | 3.5 | 0.5 | 0.7 | | 120 | 500 | 225 | 9.8 | 11.4 | 16.3 | Inventive example |
| 3 | 3.0 | 2.5 | 0.3 | | 110 | 800 | 252 | 9.7 | 11.3 | 16.5 | Inventive example |
| 4 | 3.5 | 0.5 | 0.7 | | 120 | 1000 | 224 | 9.8 | 11.0 | 12.2 | Inventive example |
| 5 | 3.0 | 2.5 | 0.3 | | 105 | 2000 | 251 | 9.7 | 11.1 | 14.4 | Inventive example |
| 6 | 3.0 | 2.5 | 0.3 | | 105 | 10000 | 255 | 10.5 | 12.2 | 16.2 | Inventive example |
| 7 | 2.2 | 0.7 | 0.3 | | 100 | 300 | 165 | 10.7 | 12.4 | 15.9 | Inventive example |
| 8 | 2.0 | 0.5 | 0.1 | | 120 | 800 | 150 | 11.0 | 12.9 | 17.3 | Inventive example |
| 9 | 0.5 | 1.2 | 0.8 | | 120 | 1500 | 100 | 11.3 | 13.7 | 21.2 | Comparative example |
| 10 | 2.2 | 0.7 | 0.3 | | 100 | 7000 | 169 | 10.9 | 12.4 | 13.8 | Inventive example |
| 11 | 2.0 | 0.5 | 0.1 | | 115 | 5000 | 153 | 11.1 | 12.6 | 13.5 | Inventive example |
| 12 | 1.5 | 1.2 | 0.8 | | 115 | 2000 | 162 | 11.3 | 12.8 | 13.3 | Inventive example |
| 13 | 1.6 | 0.6 | 0.3 | | 130 | 2000 | 133 | 11.3 | 13.8 | 22.1 | Comparative example |
| 14 | 1.6 | 0.6 | 0.3 | P: 0.07 | 140 | 1000 | 160 | 11.3 | 12.9 | 14.2 | Inventive example |
| 15 | 1.6 | 0.6 | 0.3 | Cr: 2.0 | 150 | 5000 | 198 | 9.9 | 11.3 | 14.1 | Inventive example |
| 16 | 2.2 | 0.7 | 0.3 | Sn: 0.07 | 100 | 3000 | 172 | 10.0 | 11.4 | 14.0 | Inventive example |
| 17 | 2.2 | 0.7 | 0.3 | Sb: 0.03 | 100 | 3000 | 172 | 10.0 | 11.4 | 14.0 | Inventive example |
| 18 | 2.2 | 0.7 | 0.3 | S: 0.0020 | 90 | 6000 | 171 | 11.0 | 12.5 | 13.6 | Inventive example |
| 19 | 3.0 | 0.0005 | 3.0 | | 130 | 3000 | 192 | 10.1 | 11.5 | 13.9 | Inventive example |
| 20 | 3.0 | 0.1 | 0.3 | | 160 | 4000 | 190 | 10.0 | 11.7 | 17.0 | Inventive example |
| 21 | 0.3 | 2.5 | 3.0 | P: 0.10, Cr: 1.0 | 130 | 4000 | 161 | 11.8 | 13.8 | 16.9 | Inventive example |

As illustrated in Table 4, it was found that when the number of inclusions having the grain size of 0.1 to 3.0 μm in steel was set to 1000 to 8000 pieces/mm$^2$, the iron loss deterioration ratio could be lowered to be 15% or lower even in the punching of two stacked sheets and a particularly excellent effect of preventing the deterioration in the iron loss could be provided.

As described above, with the punching process in the embodiment, when the steel sheets are stacked and are subject to the punching, the deterioration in the iron loss of the iron core can be decreased to the minimum. Accordingly,

REFERENCE SIGNS LIST

1 PRESS MACHINE
2 PINCH ROLL
3 MOLD
4 PUNCH
5 DIE
6 DIE HOLE
7 DIE PLATE
8 SHEET PRESSER
9 BIASING UNIT

10 PUNCHING DEVICE
a CLEARANCE
C STEEL STRIP COIL (ELECTRICAL STEEL SHEET)

The invention claimed is:

1. A punching method comprising:
    punching out a plurality of electrical steel sheets in a stacked state by a mold, the mold including a punch, a die and a sheet presser; and
    pressing the electrical steel sheets with the sheet presser when punching out the electrical steel sheets, wherein
    a sheet thickness of each of the electrical steel sheets is set to be 0.35 mm or less, a Vickers hardness (test force 1 kg) of the sheets is set to be 150 to 400, and an average crystal grain size of the sheets is set to be 50 to 250 µm,
    a clearance between the punch and the die, is set to be 7% or more of a minimum sheet thickness of the sheet thicknesses of the electrical steel sheets and 7% or less of a total sheet thickness of the electrical steel sheets, and
    a pressure that the sheet presser of the mold applies to the electrical steel sheets is set to be 0.10 MPa or more.

2. The punching method according to claim 1, wherein the sheet thickness of each of the electrical steel sheets is set to be 0.25 mm or less.

3. The punching method according to claim 1, wherein the electrical steel sheets contain Si of 0.5 to 6.6%, Al of equal to or lower than 2.5%, and Mn of 0.1 to 3.0% in terms of mass ratio, and the number of inclusions having a grain size of 0.1 to 3.0 in steel is set to be in a range of 1000 to 8000 pieces/mm$^2$.

4. The punching method according to claim 1, wherein a static friction coefficient between surfaces of the stacked electrical steel sheets is set to be 0.3 or more, and static friction coefficients between the electrical steel sheets and a surface of a die plate of the mold that makes contact with the electrical steel sheets and between the electrical steel sheets and a surface of the sheet presser of the mold are set to be 0.3 to 0.8.

5. The punching method according to claim 4, wherein the electrical steel sheets contain Si of 0.5 to 6.6%, Al of equal to or lower than 2.5%, and Mn of 0.1 to 3.0% in terms of mass ratio, and the number of inclusions having a grain size of 0.1 to 3.0 µm in steel is set to be in a range of 1000 to 8000 pieces/mm$^2$.

6. The punching method according to claim 2, wherein the electrical steel sheets contain Si of 0.5 to 6.6%, Al of equal to or lower than 2.5%, and Mn of 0.1 to 3.0% in terms of mass ratio, and the number of inclusions having a grain size of 0.1 to 3.0 µm in steel is set to be in a range of 1000 to 8000 pieces/mm$^2$.

7. The punching method according to claim 2, wherein a static friction coefficient between surfaces of the stacked electrical steel sheets is set to be 0.3 or more, and static friction coefficients between the electrical steel sheets and a surface of a die plate of the mold that makes contact with the electrical steel sheets and between the electrical steel sheets and a surface of the sheet presser of the mold are set to be 0.3 to 0.8.

8. The punching method according to claim 7, wherein the electrical steel sheets contain Si of 0.5 to 6.6%, Al of equal to or lower than 2.5%, and Mn of 0.1 to 3.0% in terms of mass ratio, and the number of inclusions having a grain size of 0.1 to 3.0 µm in steel is set to be in a range of 1000 to 8000 pieces/mm$^2$.

* * * * *